United States Patent
Coleman

(10) Patent No.: US 9,705,434 B2
(45) Date of Patent: Jul. 11, 2017

(54) METHOD FOR ASCERTAINING A COMMUTATION ANGLE

(71) Applicant: ETEL S.A., Môtiers (CH)

(72) Inventor: Ralph Coleman, Fleurier (CH)

(73) Assignee: ETEL S.A., Môtiers (CH)

( * ) Notice: Subject to any disclaimer, the term of this patent is extended or adjusted under 35 U.S.C. 154(b) by 27 days.

(21) Appl. No.: 14/955,677

(22) Filed: Dec. 1, 2015

(65) Prior Publication Data

US 2016/0164442 A1 Jun. 9, 2016

(30) Foreign Application Priority Data

Dec. 5, 2014 (EP) .................................... 14196445

(51) Int. Cl.
*H02P 23/12* (2006.01)
*H02P 6/16* (2016.01)
*H02P 6/14* (2016.01)

(52) U.S. Cl.
CPC .............. *H02P 6/142* (2013.01); *H02P 6/16* (2013.01)

(58) Field of Classification Search
CPC .... H02P 6/16; H02P 6/17; H02P 6/165; H02P 6/22; H02P 6/185; H02P 8/38; A61M 11/00; A61M 16/0051; A61M 16/0057; A61M 16/0063; A61M 16/0066; A61M 16/0069; A61M 16/12; A61M 16/205; A61M 16/206
USPC .......... 318/400.04, 400.12, 400.14; 324/144, 324/207.25
See application file for complete search history.

(56) References Cited

U.S. PATENT DOCUMENTS

| | | | |
|---|---|---|---|
| 5,838,122 A * | 11/1998 | Vu ............................ | H02P 6/22 318/400.12 |
| 5,874,821 A | 2/1999 | Monleone | |
| 7,309,972 B2 | 12/2007 | Kranitzky et al. | |
| 2005/0031322 A1* | 2/2005 | Boyle ...................... | H02P 6/17 388/800 |

(Continued)

FOREIGN PATENT DOCUMENTS

| | | |
|---|---|---|
| DE | 4437793 A1 | 5/1996 |
| DE | 102 13 375 | 10/2003 |

(Continued)

*Primary Examiner* — Paul Ip
(74) *Attorney, Agent, or Firm* — Andrews Kurth Kenyon LLP

(57) ABSTRACT

In a method for ascertaining a commutation angle in a permanently excited synchronous motor, the commutation angle indicates the position of a rotor within a magnetic period of the synchronous motor and is used for the field-oriented energization of the synchronous motor. The method includes the steps of specifying a random commutation angle as starting point of the method, impressing a current vector into the motor using the initially randomly specified commutation angle, ascertaining a positional deviation of the rotor, varying the commutation angle used for the energization with the aid of a controller structure in order to counteract the ascertained positional deviation, so that the commutation angle that comes about after a stabilizing period corresponds to the actual commutation angle of the rotor, an initial speed of the rotor being taken into account when ascertaining the positional deviation of the rotor.

8 Claims, 3 Drawing Sheets

(56) References Cited

U.S. PATENT DOCUMENTS

| | | | |
|---|---|---|---|
| 2005/0174104 A1* | 8/2005 | Kranitzky | H02P 6/16 324/144 |
| 2013/0043822 A1* | 2/2013 | Vu | H02P 8/38 318/696 |
| 2013/0134967 A1* | 5/2013 | Kaufmann | H02P 6/185 324/207.25 |
| 2013/0300324 A1* | 11/2013 | Kaufmann | G01D 5/24452 318/400.04 |
| 2014/0152229 A1* | 6/2014 | Grossmann | F02D 11/106 318/561 |
| 2014/0210390 A1* | 7/2014 | Huang | H02P 6/165 318/400.04 |
| 2015/0176965 A1* | 6/2015 | Shimizu | G01D 5/24476 318/400.38 |

FOREIGN PATENT DOCUMENTS

| | | |
|---|---|---|
| DE | 10226974 A1 | 1/2004 |
| EP | 0 784 378 | 7/1997 |
| EP | 1 495 535 | 1/2005 |

\* cited by examiner

METHOD FOR ASCERTAINING A COMMUTATION ANGLE

CROSS-REFERENCE TO RELATED APPLICATIONS

The present application claims priority to Application No. 14196445.2, filed in the European Patent Office on Dec. 5, 2014, which is expressly incorporated herein in its entirety by reference thereto.

FIELD OF THE INVENTION

The present invention relates to a method for ascertaining a commutation angle. Such methods are used in the control of a permanently excited synchronous motor.

BACKGROUND INFORMATION

The field-oriented control of a permanently excited synchronous motor requires knowledge of the position of the rotor in relation to the stator. This is called an angular position within a magnetic period of the motor, or also referred to as the commutation angle. Since rotary synchronous motors frequently have many (for instance, n) pole pairs, a plurality (i.e., n) of magnetic periods corresponds to one full mechanical rotation of a rotating motor. Linear motors have periodic magnetic fields as well, so that reference is made to a commutation angle within a magnetic period here, too.

The position of a rotor in the rotating motor or the position of a rotor in the linear motor (hereinafter simply referred to as rotor) is frequently detected with the aid of a position-measuring device. This device may measure in an absolute or incremental manner and thereby provide information about the movement of the rotor. However, in the case of incremental position-measuring devices, no information is available after each activation that indicates at which angle the rotor is positioned relative to a magnetic period of the motor; and in the case of absolute measuring devices, this is the case at least after the measuring device has been attached. Yet the commutation angle is required in order to be able to apply a current vector to the motor, whose moment-generating and field-generating components are aligned with respect to the motor as required.

There are numerous methods for ascertaining the commutation angle. Apart from the many methods that have ascertained the commutation angle via a measurement of electrotechnical variables such as the inductivity or the magnetic saturation, there are also a great number of methods that are based on an energization of the motor and the ascertainment of larger or smaller deflections of the rotor.

For example, German Published Patent Application No. 102 13 375 describes impressing a movement from the outside into a synchronous motor under a field-oriented control, and specifying a setpoint current of zero for the control circuit in the process. Voltages that counteract the voltages induced in the motor by the movement are therefore adjusted by the control circuit. The phase position of these voltages makes it possible to infer the commutation angle. However, these methods require greater movements of the rotor, which are not always possible.

European Patent No. 1 495 535 describes impressing current vectors having different directions into a motor which is kept stationary by a motor brake, and recording minutest deflections of the rotor that are possible despite the motor brake on account of elasticities of the mechanics, with regard to the amount and direction with the aid of a position-measuring device. Plotting this deflection over the angle of the current vectors makes it possible to infer the commutation angle. This is attributable to the fact that the largest deflection is achievable when the rotor and current vector are situated perpendicular to each other. However, this method requires a rotor that must be kept stationary and is unsuitable for systems in motion.

Another possibility for ascertaining the commutation angle is to apply a moment-generating current of a randomly selected orientation to the synchronous motor. The rotor will move then and align itself in parallel with this direction. Its position and the commutation angle are known as a result. However, such methods are disadvantageous in cases where greater movements of the rotor are undesired or where the rotor movement is subject to very little friction, because it takes a very long time in such cases until the rotor has adjusted to the desired position.

It is for this reason that methods have also become used in which it is not the rotor that aligns itself with an applied current vector; instead, the angle of the current vector is adjusted with the aid of a control circuit, such that it aligns itself with respect to the rotor, which executes only small movements about its starting position in the process. For example, European Published Patent Application No. 0 784 378 describes impressing a current vector initially at a random direction and specifying a rotational frequency of zero in so doing. A PI controller, at whose input the deviation of the measured rotational frequency from the setpoint rotational frequency (i.e., zero) is applied, outputs a correction angle by which the direction of the applied current vector must be corrected in order to keep the rotational frequency at the setpoint value of zero. That is to say, slight movements of the rotor are detected and immediately corrected, so that the rotor does not execute any larger movements. Following a brief adjustment period, the angle output by the PI controller is constant and corresponds to the commutation angle in question. However, when testing such methods it was found that a reliable detection of the commutation angle was impossible under certain conditions. In particular in systems that are in motion and have low friction, this method was unsuccessful because the commutation offset did not adjust to a fixed value. For example, this was the case in an air-bearing-supported linear motor which is moving at an initial speed.

SUMMARY

Example embodiments of the present invention provide a method for ascertaining a commutation angle in a permanently excited synchronous motor, which may reliably supply a correct result even at an initial speed of the motor that differs from zero.

According to an example embodiment of the present invention, a method is provided for ascertaining a commutation angle in a permanently excited synchronous motor, the commutation angle indicating the position of a rotor within a magnetic period of the synchronous motor and being used for the field-oriented energization of the synchronous motor. The method includes the following steps: specifying a random commutation angle as the starting point of the method; impressing a current vector into the motor using the initially randomly specified commutation angle; determining a positional deviation of the rotor; varying the commutation angle used for the energization with the aid of a controller structure in order to counteract the determined positional deviation, so that the commutation angle that comes about following an adjustment period corresponds to the actual commutation angle of the rotor, an initial speed of the rotor being taken into account when determining the positional deviation of the rotor.

Decisive is the consideration of an initial speed of the rotor. While conventional methods have attempted to compensate for any deflection of rotor R from its starting position, the method described herein takes an initial speed of the rotor into account. An attempt is made to compensate for any deviation of the rotor position from the position to be expected based on its starting position and its initial speed, using a controller, so that the angle output by the controller comes closer to the value in question. In so doing it must always be taken into account that the rotor continues its movement during the method.

With the aid of the method described herein, the commutation angle is able to be found in a reliable manner even for the described motors that are supported with low friction, despite an initial speed of the rotor.

Further features and aspects of example embodiments of the present invention are described in more detail below with reference to the appended Figures.

DETAILED DESCRIPTION

Figure 1:
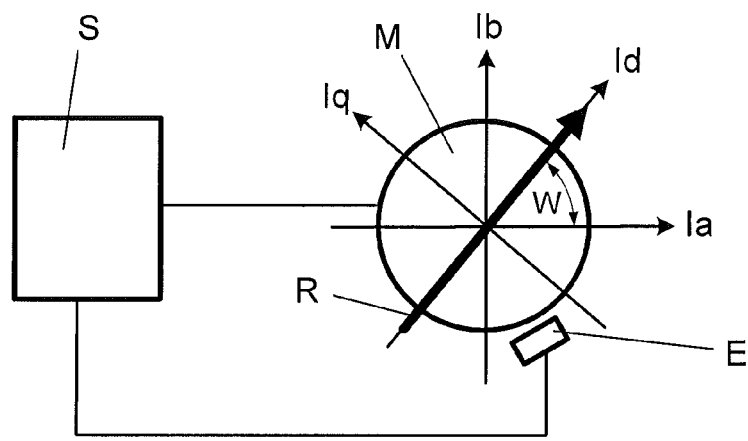
FIG. 1 schematically illustrates a synchronous motor.

FIG. 1 schematically illustrates a permanently excited synchronous motor M, into which current is impressed by an actuation S. A position-measuring device E determines the mechanical position of rotor R in motor M and reports this position to actuation S.

For the field-oriented actuation, a moment-forming current Iq is specified, which is perpendicular to rotor R, as well as a magnetization current Id, which is provided in parallel with rotor R. The total current may be seen as a vector having the components Iq and Id, the coordinate system having the Iq and Id axes rotating along with the rotor.

An actuation of motor M requires a transformation of the current vector from the system rotating along with rotor R into a stationary system having the axes Ia and Ib. This requires knowledge of angle W at all times, which varies with the rotation of rotor R and is referred to as commutation angle W. The transformation is also referred to as a Park transformation.

It should be noted that such motors M frequently have a multiplicity of magnetic periods (i.e., pole pairs), so that a complete movement of the current vector or rotor R through a magnetic period corresponds to only a partial mechanical rotation. A motor M having two pole pairs has mechanically rotated only about 180 degrees when rotor R has traversed a complete magnetic period.

It is important to note that commutation angle W must be known at all times for the Park transformation. It can be acquired with the aid of position-measuring device E provided the mechanical position of rotor R has previously been put in relation to the position of rotor R within a magnetic period of motor M. Conventional methods that are used for this purpose have been mentioned above.

Example embodiments of the present invention are based on European Published Patent Application No. 0 784 378, mentioned above, in which a commutation offset is adjusted with the aid of a controller structure, greater deflections of the rotor being avoided in so doing. However, such methods fail under certain conditions in that no stable commutation angle comes about even after a longer period of time. In particular, systems featuring with low-friction bearings and an initial speed that differs from zero are problematic. For example, in a linear motor having air bearings and a cable drag chain at the motor, it is not easy to obtain an initial speed of zero because forces are acting on the rotor in such a case and lead to movements.

Figure 2:
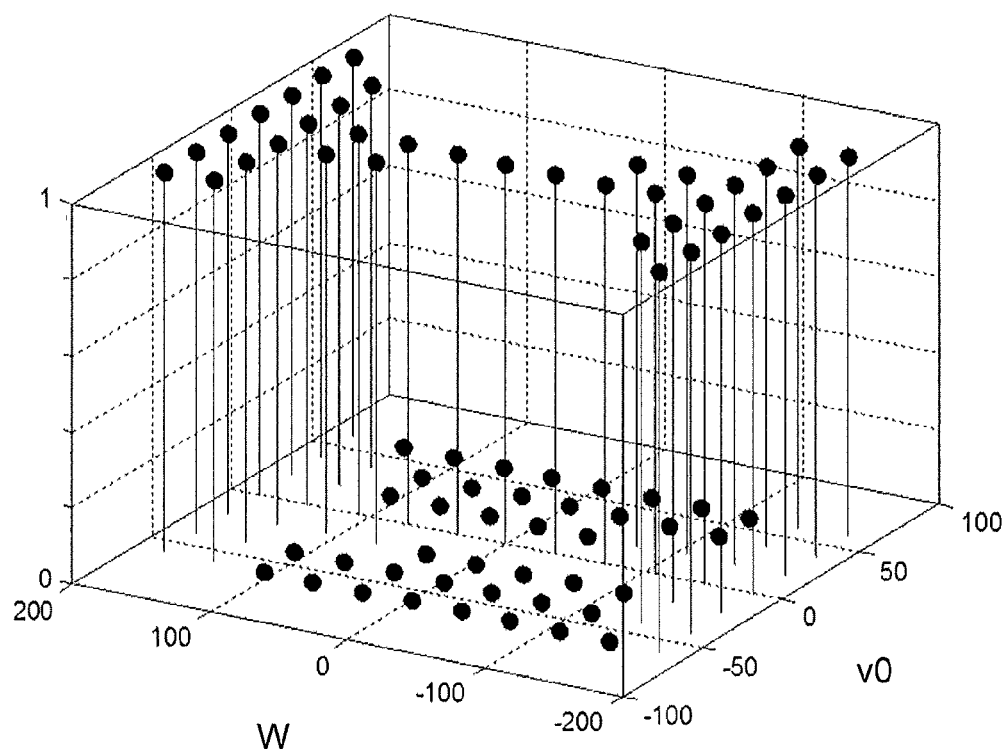
FIG. 2 illustrates problems in the detection of the commutation angle at different initial speeds of the rotor according to conventional methods.

FIG. 2 illustrates that this commutation angle W can be successfully determined only for certain combinations of an initial speed v0 (in random units) and an initially unknown commutation angle W (in degrees). These combinations having the attribution value 1 are shown in FIG. 2. In the other cases the commutation angle obtained by the controller structure does not converge, and the method fails. These points are shown with the attribution value 0. It is apparent that the method is indeed invariably successful for a rotor R that is at rest, but fails in many cases when initial speed v0 differs from zero.

In the following text, a method for ascertaining commutation angle W is therefore described that allows the reliable ascertainment of the respective commutation angle W for all possible commutation angles W even at an initial speed v0 that differs from zero. This method is explained with the aid of circuit diagrams, which symbolize the sequence of the method. The specific implementation of the method is irrelevant, however. In modern systems S for actuating a motor M, such methods are usually implemented in software which is activated if required.

Figure 3:
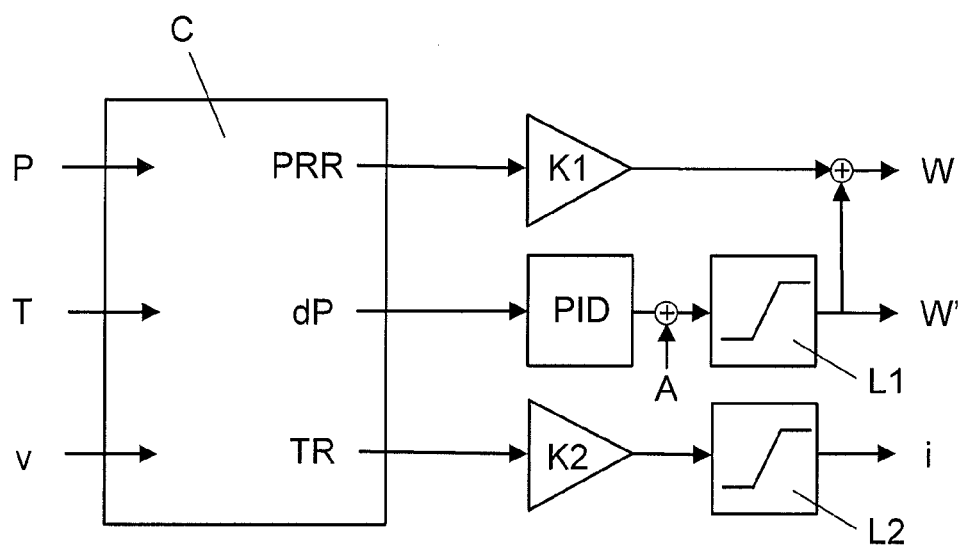
FIG. 3 illustrates a controller structure for ascertaining the commutation angle according to an example embodiment of the present invention.

FIG. 3 illustrates a computer unit C, which receives the following input values:

The current position P of rotor R. It can be ascertained with the aid of position-measuring device E.

The current speed v of rotor R. It can be ascertained by a temporal derivative of positional value P.

A trigger signal T, which triggers the start of the method for ascertaining the commutation angle in that trigger signal T changes from "0" to "1."

The computer unit outputs the following values:

The value of a position reference ramp PRR, which corresponds to a travel that rotor R has covered based on its initial speed v0 at the time of the switchover of trigger signal T until the current instant. In other words, one would expect that, due to its initial speed v0, rotor R has continued to move by PRR since the start of the method.

Positional deviation dP of rotor R from its expected position corresponding to position reference ramp PRR. At an initial speed of v0=0, dP would indicate the distance from the neutral position.

A time ramp TR, which indicates the time that has elapsed since trigger signal T.

The manner in which the three output values PRR, dP und TR are ascertainable from input values P, v und T is explained below with reference to FIG. 4.

The values output by computer unit C are processed as described below.

Positional deviation dP of rotor R from its expected position according to positional reference ramp PRR is transmitted to a controller PID, which attempts to control this positional deviation dP to zero, if possible, in that a commutation offset W', which indicates the position of rotor R, but disregards the initial speed v0 of rotor R, is made available at its output. Small deflections of rotor R are corrected by actuation S, which, however, can be completely successful only if controller PID correctly outputs commutation offset W'. As long as this is not the case yet, small deflections are unavoidable, but allow controller PID to adjust commutation offset W' and thereby output correct commutation offset W' following a settling-down time.

Controller PID may be a conventional industrial PID controller having a proportional, an integral and a differential component. The integrated positional deviation in the integral component of controller PID should be restricted to a value in the range of +/−180 degrees in relation to a magnetic period. Low-pass filters may be provided in the differential component of controller PID, which filter out the particular frequencies from the positional deviation derived according to the time that could lead to mechanical resonances and thus even to a failure of the method. The noise of the position measurement is amplified considerably by the derivation in the differential component of controller PID at higher frequencies.

Furthermore, a limiter L1 also limits commutation offset W' output by controller PID to a value range of +/−225 degrees. All possible positions of rotor R within one magnetic period lie within this range, so that the limiter thereby prevents a runaway of commutation offset W' in the event that the method fails.

In order to obtain current commutation angle W, which takes the initial speed v0 of rotor R into account and varies with the movement of rotor R, the value of position reference ramp PRR, which indicates the travel covered since the start of the method (since the triggering of trigger T), is multiplied by a factor K1 in order to convert the travel that is related to mechanical rotations of rotor R into rotations that are related to a magnetic period of motor M. For a rotating motor M having four pole pairs, this factor would be K1=4. Added to this value is also commutation offset W' which is output by controller PID (and is constant following the stabilization of controller PID) in order to thereby obtain the rotor position, which constantly varies on account of initial speed v0, within a magnetic period of motor M, as current commutation angle W. The result of this addition thus is commutation angle W, on the basis of which actuation S is able to perform a Park transformation for the energization of motor M.

If a linear motor is actuated, factor K1 is used for converting a magnetic period τ of the linear motor given in a unit of length (e.g., 64 mm) into a commutation angle for controlling the linear motor. K1=360°/τ therefore applies to K1.

Time ramp TR is multiplied by a factor K2 in order to obtain a current that rises with the time, which is used as parameter for current vector i impressed into motor M. Furthermore, this current vector i is limited by a limiter L2, so that, for example, the amount of current vector i rises to its maximum value within the first ten milliseconds of the method and remains there until controller PID has stabilized and commutation angle W has been found. Because of this rising current, the method starts more softly, and violent excursions of rotor R as a result of a completely ill adjusted commutation angle W at the beginning are avoided.

Since there are also disadvantageous positions of rotor R in relation to applied current vector i, in which no torque is generated (when the current vector and rotor R are positioned in parallel) and controller PID also has no reference point for necessary corrections of commutation offset W' because of a lack of deflection, it is advisable to apply an interference signal A at the output of controller PID at the start of the method. This interference signal, for instance, may correspond to an angular range of 0-90 degrees, which is switched between controller PID and limiter L1 in the form of a linear ramp within one half of a second. This should be done immediately following trigger signal T and be completed even before controller PID has stabilized. Since controller PID immediately compensates for this interference signal, the rotor moves only slightly as a result.

Figure 4:
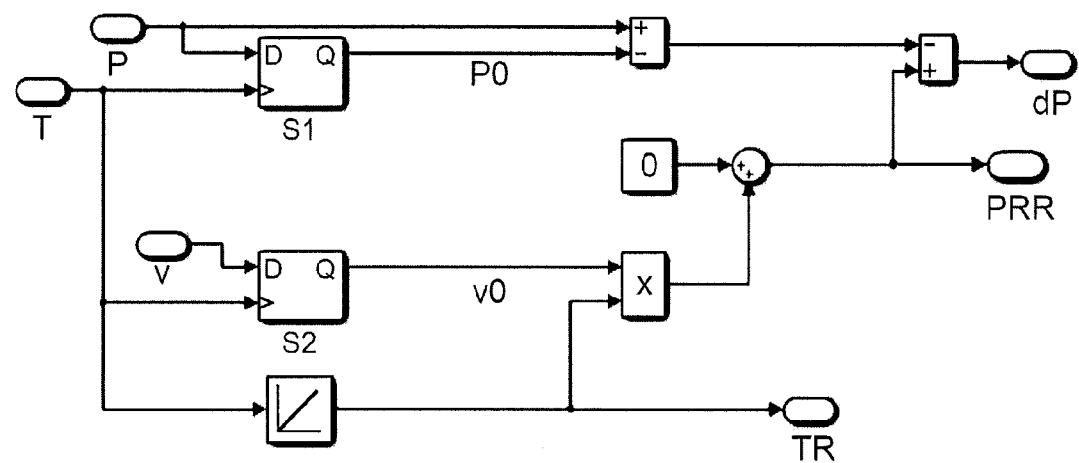
FIG. 4 illustrates the controller structure.

FIG. 4 shows the manner in which computer unit C uses aforementioned input values P, T, v for generating output values PRR, dP and TR.

To begin with, it is illustrated in FIG. 4 that current position P as well as current speed v are transmitted to a latch S1 and S2 respectively (also referred to as latch circuit). If trigger signal T is switched over, the two values are retained in the respective latch S1, S2 and made available as starting position p0 or initial speed v0 for the further processing.

In addition, trigger signal T is integrated, so that this integral supplies time TR that has elapsed since the switchover of trigger signal T. This time TR is output as output value TR as described earlier.

The product of initial speed v0 and time TR that has elapsed since the switchover of trigger signal T is output as position reference ramp PRR, as described above.

The difference between current positional value P and starting position p0 retained in latch S1 is deducted from position reference ramp PRR and output as output value dP, as described above.

The subdivision made here into a controller structure according to FIG. 3 and a computer unit C according to FIG. 4 has been selected at random; the individual functionalities can be implemented in the most varied manners. Decisive is the consideration of an initial speed v0. While conventional methods attempt to compensate for any deflection of rotor R from its starting position, the method described herein takes into account an initial speed v0 of the rotor. It is attempted to compensate for any deviation of the rotor position from the position to be expected based on its starting position PO and its initial speed v0 via an adaptation of commutation offset W'.

Figure 5:
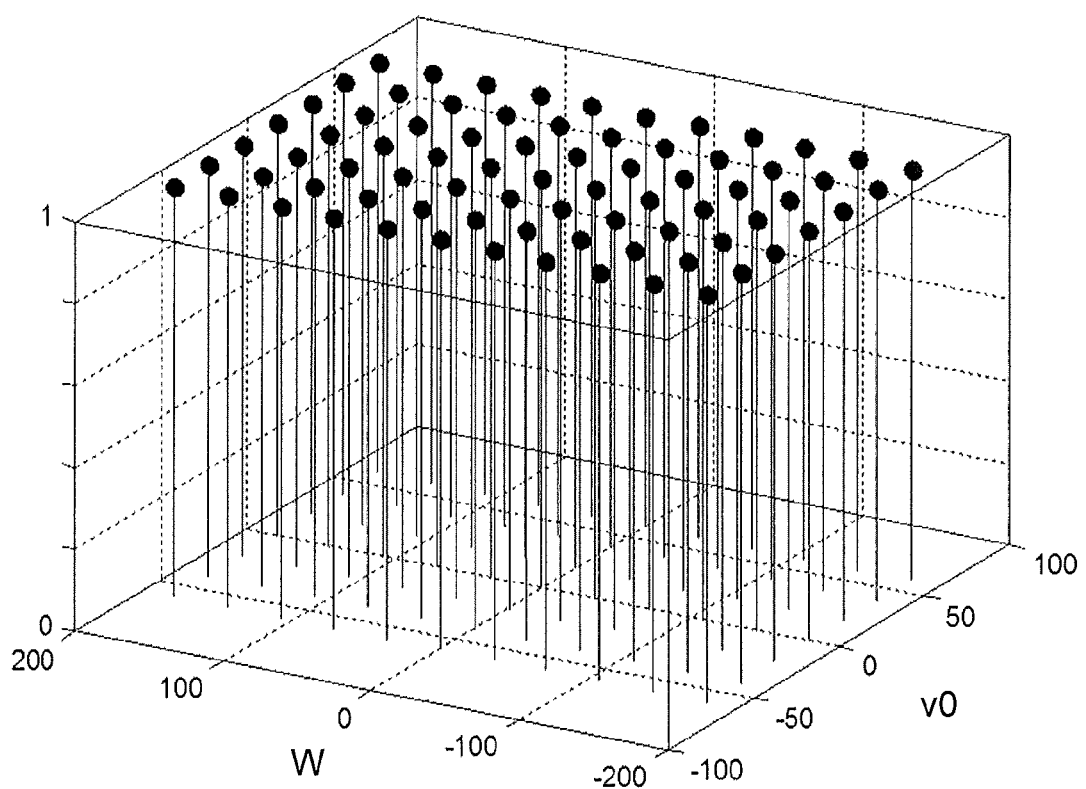
FIG. 5 illustrates the successful acquisition of the commutation angle at different initial speeds of the rotor.

The success of this measure is illustrated by FIG. 5. When comparing it with FIG. 2, it is apparent that commutation angle W is ascertained correctly without exception, regardless of the searched for commutation angle W and initial speed v0.

The method described herein does not cause rotor R to be decelerated. Instead, there is even compensation of a certain amount of friction and rotor R is maintained at its initial speed v0. In system in which friction is not negligible, it is therefore advisable to take the expected deceleration of rotor R into account. For example, a model for the friction could be installed in computer unit C, so that the value of position reference ramp PRR considers the deceleration caused by the friction. A model of this type must convert the inertia of rotor R and the prevailing frictional force into a negative deceleration according to Newton's Second Law.

A deceleration of rotor R can be implemented following the successful ascertaining of commutation angle W by actuation S, if this is desired.

Notwithstanding the fact that the foregoing description is predominantly based on rotating motors M, the method hereof may be applied to linear motors as well. Air-bearingsupported, in particular low-friction linear motors are even especially interesting application examples, in which conventional methods fail. If a linear motor is seen as a rotating motor that can mechanically execute only one rotation, then this one "mechanical rotation" is subdivided into numerous "magnetic rotations" in accordance with the number of pole pairs on the magnetic track of the linear motor.

What is claimed is:

1. A method for ascertaining a commutation angle in a permanently excited synchronous motor, the commutation angle indicating a position of a rotor within a magnetic period of the synchronous motor and being used for field-oriented energization of the synchronous motor, comprising:
specifying a random commutation angle as a starting point;
impressing a current vector into the motor using the initially randomly specified commutation angle;
ascertaining a positional deviation of the rotor, taking into account an initial speed of the rotor; and
varying the commutation angle used for the energization with the aid of a controller structure in order to counteract the ascertained positional deviation, so that the commutation angle that results following a stabilizing period corresponds to the actual commutation angle of the rotor.

2. The method according to claim 1, wherein the initial speed is taken into account by adding to a difference resulting from a current position of the rotor and a starting position, a product of a time that has elapsed since starting the method and the initial speed, in order to obtain the positional deviation, which indicates to what extent the rotor deviates from a position to be expected based on its initial speed and the starting position.

3. The method according to claim 1, wherein a friction that reduces the initial speed of the rotor is taken into account when ascertaining the positional deviation.

4. The method according to claim 1, wherein a value of the current vector increases over time.

5. The method according to claim 4, wherein a value of the current vector increases up to a limit value.

6. The method according to claim 1, wherein the positional deviation of the rotor is ascertained by a position-measuring device.

7. The method according to claim 1, wherein an interference signal is switched to an output of the controller in order to overcome unfavorable starting positions, in which the impressed current vector is unable to have any effect.

8. The method according to claim 7, wherein the interference signal corresponds to an angle ramp that is switched to the output of the controller during a time interval.

* * * * *